US007754091B2

(12) United States Patent
Pires

(10) Patent No.: US 7,754,091 B2

(45) Date of Patent: Jul. 13, 2010

(54) CUSTOM LAMP FROM FINISHED EL PANEL

(75) Inventor: David G. Pires, Phoenix, AZ (US)

(73) Assignee: World Properties, Inc., Lincolnwood, IL (US)

(*) Notice: Subject to any disclaimer, the term of this patent is extended or adjusted under 35 U.S.C. 154(b) by 472 days.

(21) Appl. No.: 10/930,555

(22) Filed: Aug. 31, 2004

(65) Prior Publication Data

US 2006/0043059 A1 Mar. 2, 2006

(51) Int. Cl.
*B44C 1/22* (2006.01)
*C03C 15/00* (2006.01)

(52) U.S. Cl. ............................... 216/83; 216/5; 216/13; 216/41; 313/483; 313/505; 313/506

(58) Field of Classification Search ..................... 216/5, 216/13, 41, 83; 313/483, 505, 506
See application file for complete search history.

(56) References Cited

U.S. PATENT DOCUMENTS

| | | | | |
|---|---|---|---|---|
| 2,922,912 | A | 1/1960 | Miller | 313/108 |
| 3,109,959 | A | 11/1963 | DeLaChapelle et al. | 315/74 |
| 4,670,097 | A * | 6/1987 | Abdalla et al. | 216/13 |
| 5,096,735 | A * | 3/1992 | Nakaya et al. | 427/573 |
| 5,491,379 | A | 2/1996 | Daigle et al. | 313/509 |
| 5,821,691 | A | 10/1998 | Richie et al. | 313/506 |
| 5,830,028 | A * | 11/1998 | Zovko et al. | 446/15 |
| 6,066,830 | A | 5/2000 | Cline et al. | 219/121.69 |
| 6,449,082 | B1 | 9/2002 | Agrawal et al. | 359/275 |
| 6,624,571 | B1 * | 9/2003 | Toyoyasu et al. | 313/510 |
| 6,773,614 | B2 * | 8/2004 | Field | 216/5 |

FOREIGN PATENT DOCUMENTS

| | | | |
|---|---|---|---|
| JP | 02-213087 | * | 8/1990 |
| JP | 04-039892 | * | 2/1992 |

* cited by examiner

*Primary Examiner*—Shamim Ahmed
(74) *Attorney, Agent, or Firm*—Paul F. Wille

(57) ABSTRACT

A two step etch is used to provide access to the front electrode of an EL panel cut from a larger EL panel. The two step etch produces a set back that electrically isolates the front electrode and enables a conductive layer to be easily deposited on the front electrode. A kit contains the necessary materials and instructions for practicing the method.

2 Claims, 1 Drawing Sheet

CUSTOM LAMP FROM FINISHED EL PANEL

BACKGROUND OF THE INVENTION

This invention relates to an electroluminescent (EL) panel and, in particular, to an EL panel from which smaller lamps can be made from a completed panel. As used herein, an EL "panel" is a single substrate including one or more luminous areas, wherein each luminous area is an EL "lamp."

An electroluminescent (EL) lamp is essentially a capacitor having a dielectric layer between two conductive electrodes, one of which is transparent. The dielectric layer can include a phosphor powder or there can be a separate layer of phosphor powder adjacent the dielectric layer. The phosphor powder radiates light in the presence of a strong electric field, using very little current.

A modern (post-1985) EL panel includes a front electrode that is typically a thin, transparent layer of indium tin oxide or indium oxide on a substrate such as a sheet of polyester or polycarbonate, which provides mechanical support for the other layers. Such coated sheets are commercially available. The panel is typically made by screen printing a phosphor layer on the front electrode, then screen printing a dielectric layer on the phosphor layer, and then screen printing a rear electrode on the dielectric layer. Individual lamps are made by cutting or punching the sheet.

An EL lamp is luminous only where the front electrode and the rear electrode overlap and there is an AC voltage across the electrodes. It is relatively easy to make electrical contact to the rear electrode. The front electrode is buried between the transparent substrate and the phosphor layer. Typically, the screen printed layers are patterned or are printed over a slightly smaller area than the front electrode to expose a portion of the front electrode in a finished lamp. Simply cutting a lamp into two or more pieces does not necessarily make smaller lamps. One needs access to both electrodes.

U.S. Pat. No. 5,491,379 (Daigle et al.) describes an EL panel in which the front electrode is exposed along one edge of the panel and a conductive contact is printed on the exposed front electrode and over a portion of the rear electrode, separated from the rear electrode by an insulating layer. This provides electrical contact to both electrodes within a small area on the rear of the lamp. A plurality of such contacts are printed along the length of the panel, corresponding to the locations of the lamps. U.S. Pat. No. 3,109,959 (DeLaChapelle et al.) discloses essentially the same idea implemented in pre-1985 technology; i.e. the lamp layers are not screen printed and a metal clip (rather than a screen printed conductor) extends around the layers to make contact with the front electrode. The clip is separated from the rear electrode by an insulating layer.

U.S. Pat. No. 5,821,691 (Richie et al.) discloses an EL panel in which the contact for a front electrode extends continuously along a long edge on the back of the panel whereby the contact does not restrict or define the location of lamps in the EL panel, enabling a plurality of lamps of various sizes to be included in a single panel.

The prior art relates to providing for custom or individual lamps during manufacture; viz. by providing a connection to the front electrode. This is fine for a large number of lamps. Manufacturing a small number of lamps, e.g. one or two up to a few dozen, is expensive and usually not commercially viable. What is needed in the art is a method for making custom lamps from a finished, larger EL lamp and a kit for doing so. By "finished" is meant that the lamp or panel includes all necessary layers and is suitable for sale in markets other than the low volume, custom lamp market as a completed lamp or panel.

The ability to make smaller EL lamps from panels could be of interest both to the manufacturer of EL panels and to customers that buy a large amount of EL lamps but discover they have an excess supply. A small volume, custom lamp maker is a potential customer for lamps from either source.

Often the person making a custom EL lamp is primarily in another business; i.e. he is not one of ordinary skill in the art of making EL lamps and the lamp is but a component in a product. Thus, one has the problem of providing a method and apparatus that can be used by a relatively unskilled person, yet have a very high rate of success in making a commercially viable lamp.

In view of the foregoing, it is therefore an object of the invention to provide a method for economically making custom lamps from a finished large area lamp or panel.

Another object of the invention is to provide a kit for economically making custom lamps from a finished large area lamp or panel.

A further object of the invention is to provide a method for salvaging EL panels for other uses.

Another object of the invention is to provide reliable access to the front electrode in an EL panel cut from a larger panel.

A further object of the invention is to provide a method and apparatus that can be used successfully by those unskilled in the art of making EL lamps.

SUMMARY OF THE INVENTION

The foregoing objects are achieved in this invention in which at a two step etch is used to provide access to the front electrode of an EL panel cut from a larger EL panel. The two step etch produces a set back that electrically isolates the front electrode and enables a conductive layer to be easily deposited on the front electrode. A kit contains the necessary materials and instructions for practicing the method.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
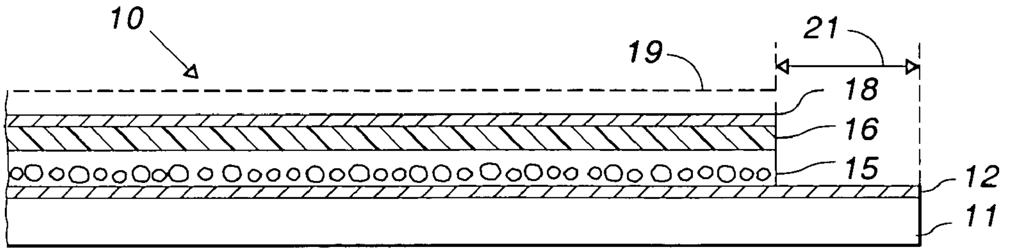
FIG. 1 is a cross-section of an EL panel.

FIG. 1 is a cross-section of an EL panel. The layers are not shown in proportion. The panel can be made by any conventional technique such as screen printing, roll coating, or other technique. The panel may be made in rolls or in batches.

In panel 10, transparent substrate 11 is a sheet of polyester or polycarbonate. Transparent, front electrode 12 overlies substrate 11 and is typically a thin layer of indium tin oxide or indium oxide. Phosphor layer 15 overlies the front electrode and dielectric layer 16 overlies the phosphor layer. Layers 15 and 16 are combined in some applications. Overlying dielectric layer 16 is rear electrode 18 containing conductive particles such as silver or carbon in a resin binder. An optional rear insulator 19 is also sometimes used.

In a large area panel, phosphor layer 15, dielectric layer 16, and rear electrode 18 do not cover front electrode 12 along one edge of panel 10, leaving border or region 21 along the right-hand edge of panel 10 as illustrated in FIG. 1. A suitable conductive ink (not shown) is typically deposited on the front electrode in region 21, forming a bus bar and protecting the ITO layer.

Figure 2:
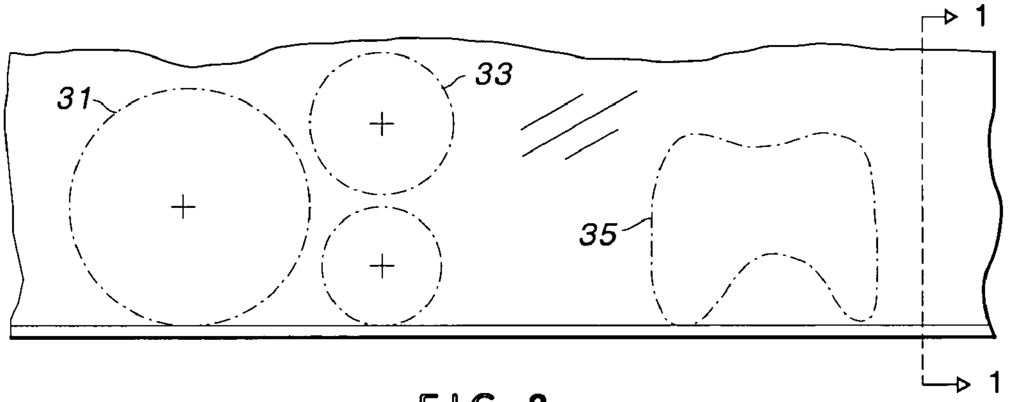
FIG. 2 is a plan view of an EL panel.

FIG. 2 is a plan view of an EL panel and is not drawn to scale. FIG. 1 is a cross-section taken along line 1-1 in FIG. 2. Panel 10 could be cut along any of cut lines 31, 33, and 35. Although cut lines 31 and 35 could be moved to intersect the lower edge of panel 10, and include the exposed portion of the front electrode, it is assumed for the sake of example that they do not.

In accordance with the invention, a smaller lamp or panel is made as follows.

Figure 3:
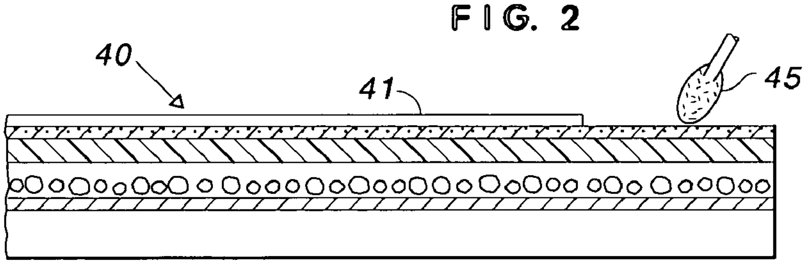
FIG. 3 illustrates the first etch step in accordance with the invention.
Figure 4:
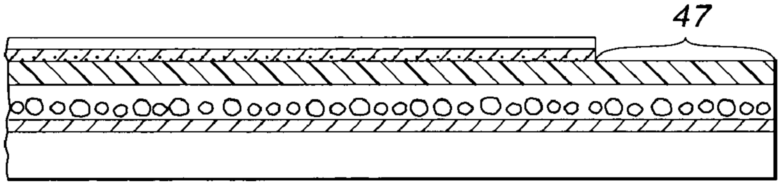
FIG. 4 illustrates the result of the first etch step.
Figure 5:
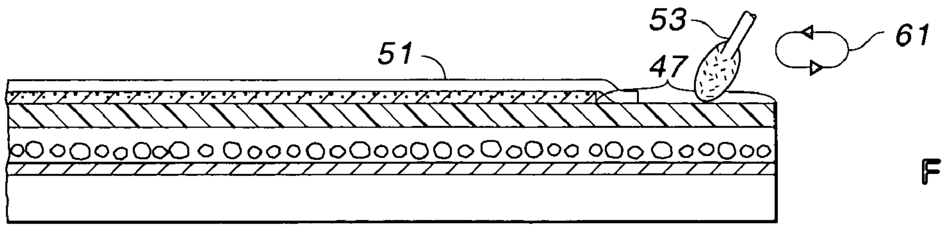
FIG. 5 illustrates the second etch step in accordance with the invention.
Figure 6:
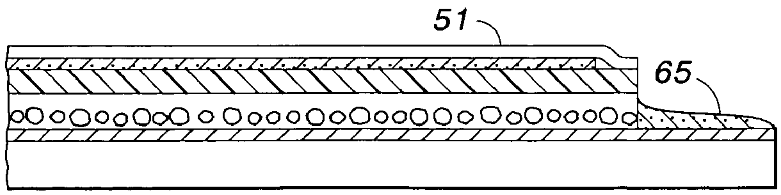
FIG. 6 illustrates the result of the second etch step.

1. Cut a lamp out and include an area for connection to the front electrode. The lamp in this area has an ITO layer, phosphor layer, dielectric layer, and rear electrode but no rear insulator.
2. Mask around the area with tape; see FIG. 3 where mask 41 overlies a portion of the upper surface of lamp 40.
3. Moisten a cotton swab or pad using a solvent that only acts upon the rear electrode material (e.g. benzyl alcohol on Asahi FTU20D3 carbon ink) and gently wipe the exposed area to remove the carbon ink, as illustrated in FIG. 3 by swab 45. A slight gray tinge will be left on the dielectric layer. As illustrated in FIG. 4, the rear electrode is removed, leaving cleared area 47.
4. Reduce the cleared area by re-masking or moving the existing mask into the cleared area by about 1.5 mm so a thin strip of cleaned dielectric is under the mask. As illustrated in FIG. 5, mask 51 overlies a portion of cleared area 47. This offsets the rear electrode from the contact to the front electrode and improves electrical isolation.
5. Moisten a cotton swab or pad with a solvent that will dissolve the remaining inks (e.g. acetone) and gently wipe the ink off in a direction perpendicular to the masked edge leaving nothing but the ITO. The direction of wipe, indicated by arrow 61, is important to avoid creating scratches in the ITO that would separate the contact area from the rest of the lamp or permit the solvent to attack the substrate. The solvent removes the exposed portions of the phosphor layer and the dielectric layer but does not attack the ITO layer, leaving an exposed area of ITO.
6. Apply a conductive ink to the exposed ITO and dry or cure the ink, as illustrated in FIG. 6 by ink layer 65. The dried or cured ink is now ready to accept a suitable connector, such as a crimp, low insertion force connector, or eyelet. The ink can include carbon, silver, or other particles for conductivity.

Mask layer 51 is removed or not, as desired.

The invention thus provides a method for economically making custom lamps from a finished lamp or panel. The invention also provides a kit for economically making custom lamps from a finished large area lamp or panel. EL panels can be salvaged from other uses and contact to the front electrode can be made successfully by those unskilled in the art of making EL lamps. The two step etch helps assure success in that a single step etch could dissolve the rear electrode into the front electrode, short circuiting the lamp. The second etch requires a little care but one is dealing with someone unskilled in a particular art, not someone who is generally inept.

Having thus described the invention, it will be apparent to those of skill in the art that various modifications can be made within the scope of the invention. For example, one can swab the second solvent any way one wishes. The chances of success are higher if the preferred direction is used. One could use other techniques for masking but, again, this is for a small scale operation and tape is simple and effective. By using a mask, one can place the connector to the front electrode anywhere on the lamp, a further advantage for the user. Because the lamp is masked, one could even spray on the solvent and then wipe with a soft cloth or swab. A small spray bottle would have the advantage of remaining closed during use, reducing the chance for spillage. The problem is finding a suitable container and spray mechanism at reasonable cost. Spraying has the advantage that one could use a sheet of material as a reusable mask that does not stick to the lamp. If the connection to the front electrode were made along an edge of the lamp, one could etch by dipping the edge of the lamp in solvent, with or without agitation, but dipping is more suited to a large scale operation. One could remove the rear electrode by abrasion or ablation if the user were familiar with such operations. A swab provides a certain amount of mild abrasion. A soft brush is also a suitable applicator. Brushing would tend to use more solvent than swabbing because one is relying more on chemical removal than mechanical removal. A swab of woven or non-woven material could be used instead of the preferred cotton swab.

What is claimed as the invention is:

1. A method for providing an electrical connection to the front electrode of a piece cut from an EL panel, wherein an EL panel is a substrate including one or more luminous areas, wherein each luminous area is formed by a dielectric layer and a phosphor layer between a rear electrode and a front electrode, and wherein at least some of the layers and electrodes are formed by the steps of depositing a layer of ink and curing the ink, said method comprising:

covering said piece to define a area for making electrical contact;

removing the rear electrode from said area by dissolving the rear electrode with a first solvent;

dissolving the phosphor layer and the dielectric layer from said area with a second solvent to reveal the front electrode of said piece;

covering said front electrode with a conductive layer in said area to reinforce said front electrode to receive an electrical connector.

2. The method as set forth in claim 1 wherein said removing step is followed by the step of reducing the defined area to offset the rear electrode from exposed area of the front electrode.

* * * * *